Jan. 23, 1940.  W. T. CALDWELL  2,188,106
PISTON
Filed Feb. 28, 1938  2 Sheets-Sheet 1
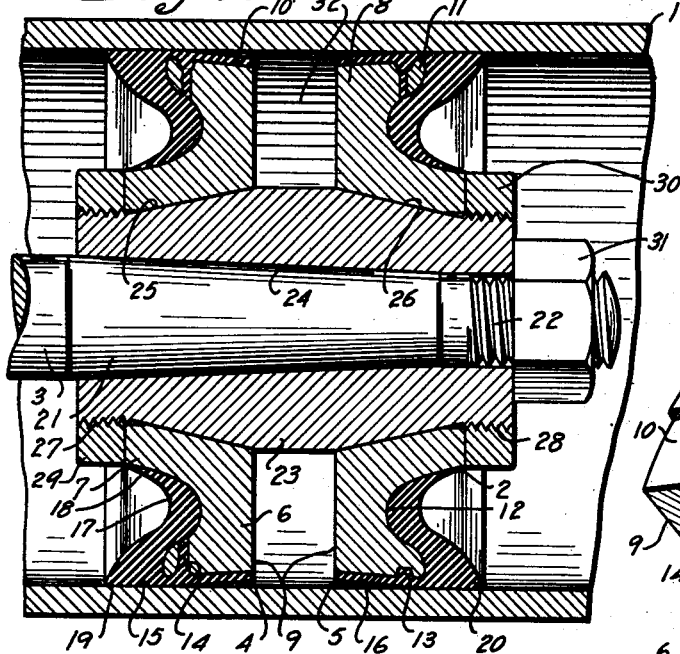
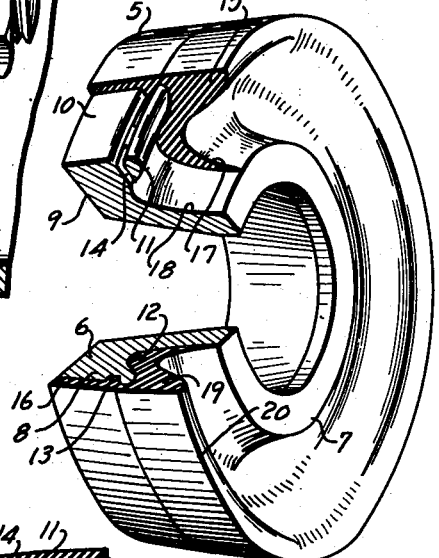
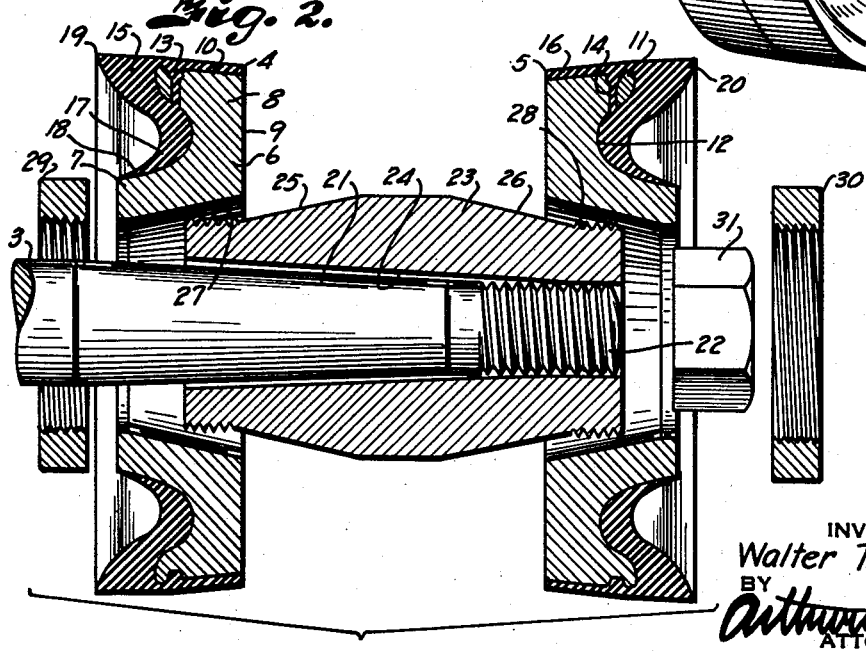
INVENTOR
Walter T. Caldwell
BY
Arthur G. Brown
ATTORNEY Jan. 23, 1940.    W. T. CALDWELL    2,188,106
PISTON
Filed Feb. 28, 1938    2 Sheets-Sheet 2
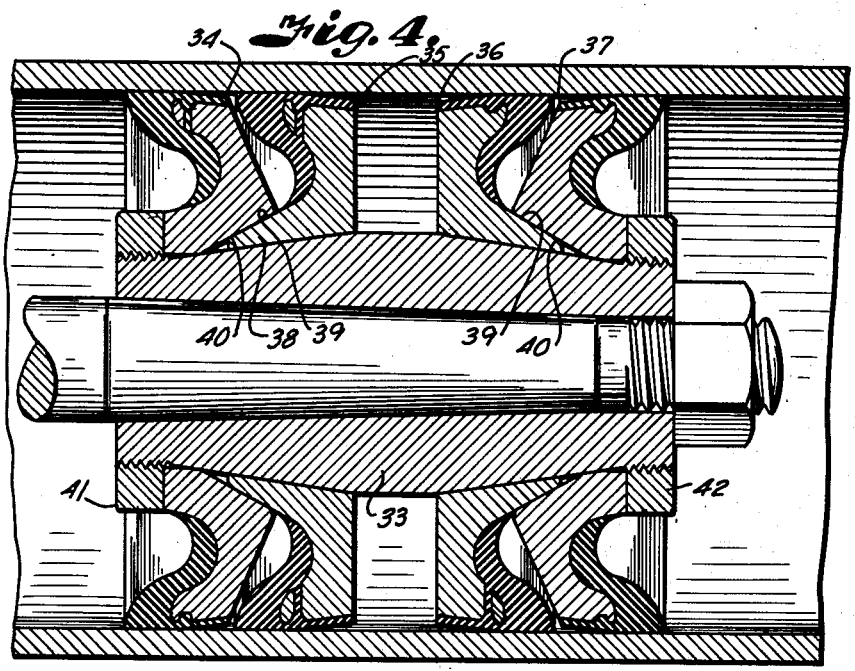
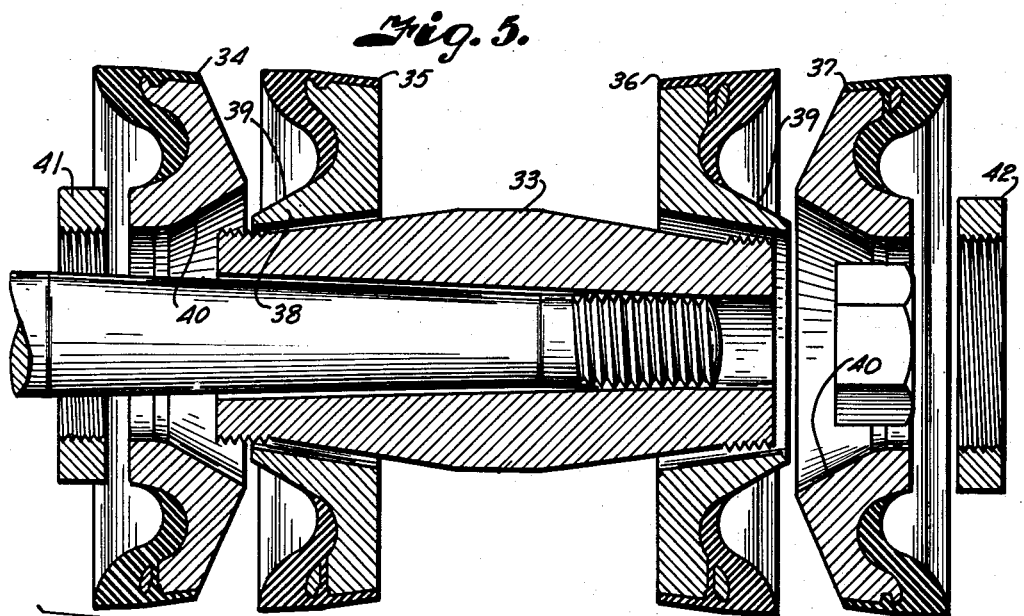
INVENTOR
Walter T. Caldwell.
BY
ATTORNEY Patented Jan. 23, 1940

2,188,106

UNITED STATES PATENT OFFICE 2,188,106

PISTON

Walter T. Caldwell, Enid, Okla., assignor to The George E. Failing Supply Company, Enid, Okla., a corporation of Oklahoma Application February 28, 1938, Serial No. 193,113

8 Claims. (Cl. 309—4)

This invention relates to pistons and particularly to those for use in double acting pumps, hydraulic jacks and like devices wherein the pistons are equipped with composite packing rings including resilient portions that are sufficiently flexible to be urged into sealing contact with a cylinder wall responsive to fluid pressure acting thereon.

Packings of this character are usually assembled upon the tapered end of a piston rod and retained against movement by heads engaging the respective sides thereof. Due to the structural characteristics of the packing rings they are difficult to retain in tight condition on the rod, therefore, while adequate seals may be maintained about the peripheries of the packings, leakage occurs through the inner portions of the packing rings and about the piston rod.

It is, therefore, a principal object of the present invention to provide a piston of this character wherein the packing members are separately and sealingly wedged upon a retaining sleeve, which in turn has a tapered fit upon the piston rod, so as to prevent leakage through the piston assembly.

It is also an important object of the present invention to provide an improved packing ring, including a metallic body having the resilient material securely anchored thereto.

It is a further object of the invention to provide a piston construction of this character which lends itself to tandem mounting of a plurality of packing rings arranged to effect pressure seal on the respective ends of the piston.

In accomplishing these and other objects of the invention, as hereinafter pointed out, I have provided improved details of structure, the preferred forms of which are illustrated in the accompanying drawings, wherein:

Fig. 1 is a longitudinal section through a portion of a double acting pump cylinder equipped with a piston construction in accordance with the present invention, the piston elements being shown in section to better illustrate their construction.

Fig. 2 is a similar section through the parts of the piston shown in slightly spaced relation.

Fig. 3 is a detail perspective view of one of the packing rings, portions of which are broken away to better illustrate mounting of the flexible material on the backing member.

Fig. 4 is a sectional view similar to Fig. 1 showing tandem mounting of the packing rings.

Fig. 5 is a section through the parts of the piston illustrated in Fig. 4 shown in slightly spaced relation.

Referring more in detail to the drawings:

1 designates a portion of the cylinder of a slush pump, hydraulic jack or similar apparatus, wherein fluid is acted upon by a piston 2 under high working pressures, as in the case of a pump or wherein a high pressure fluid reciprocates the piston as in the instance of a hydraulic jack. In either instance the piston is slidable relatively to the cylinder under control of a piston rod 3. The piston 2 is designed to maintain a seal between the high pressure fluids in the respective ends of the cylinder and therefore is provided with oppositely facing packing rings 4 and 5, each including a body or backing member 6 that is formed of rigid material and includes a hub 7 having an annular, radially extending flange 8 at one end thereof of slightly smaller diameter than the inner diameter of the cylinder.

The flange 8 is provided with a flat end face 9 registering with the outer end of the hub, a slightly inclined peripheral face 10 sloping toward the face 9, and an inner, annular rim 11 that merges into the outer periphery of the hub in rounded curves, as indicated at 12. Extending about the periphery of the flange, and separating the face 10 from the rim 11, is an annular groove 13 to cooperate with radially extending slots 14 for anchoring a resilient material 15 forming the sealing element of the ring. The resilient material is mounted on the backing member to provide a relatively thin covering 16 for the face 10, and a covering 17 for the rim and peripheral hub portions of the backing member. The cover 17 increases in thickness from the outer face 18 of the hub toward the rim 11 and is shaped to form an annular, flexible lip 19 projecting over the hub portion of the backing member and having a tapered annular face of slightly larger diameter than the inner diameter of the cylinder to effect slight compression thereof when the piston is inserted in the cylinder. The terminal edge 20 of the annular lip is sufficiently flexible that the pressure acting thereagainst ordinarily forces it into sealing engagement with the walls of the cylinder to prevent leakage about the periphery thereof.

When the resilient material is moulded on the backing member, portions of the material enter the groove 13 and pass through the slotted openings 14 to resiliently key the material of the backing member to prevent loosening thereof incidental to operation of the piston. In order to prevent leakage of high pressure fluid through the piston assembly, and at the same time rigidly anchor the packing rings independently of each other, the piston rod 2 is provided with a tapered portion 21, terminating in a reduced, threaded end 22. Wedged upon the tapered portion of the rod is a sleeve 23, having a tapered, axial bore 24 conforming to the taper of the rod as shown in Fig. 1. The outer periphery of the sleeve has its ends provided with spaced tapered seats 25 and 26 sloping toward the ends thereof and terminating in threaded necks 27 and 28 to mount nuts 29 and 30 for wedgingly retaining the packing rings on the tapered seats of the sleeve.

The piston, when assembled, is retained upon the tapered portion of the rod by means of a jam-nut 31 that is threaded onto the reduced end of the rod, as shown in Fig. 1.

In assembling a piston as described, the packing rings are applied over the tapered ends of the sleeve and are urged into wedging relation therewith upon application and tightening of the nuts 29 and 30 so as to avoid leakage between the bores of the hubs and the mounting sleeve. Attention is directed to the fact that there is sufficient space between the packing rings, as indicated at 32, to permit tightening thereof on the sleeve without contacting the faces 9 of the backing members. The piston is then applied to the tapered end of the rod and wedgingly retained thereon through application and tightening of the nut 31, which effects a tight seal about the rod and prevents leakage therethrough.

When the packing elements are thus applied they retain their fixed mounting upon the mounting sleeve and it is impossible for them to work loose incidental to operation of the piston. The same is true of the mounting sleeve, since it has an independent, tapered fit upon the rod.

In Fig. 4 is illustrated a modified form of the invention wherein the mounting sleeve 33 is of identically the same construction as the mounting sleeve in the first form of the invention, however, it is slightly longer to permit mounting of tandem packing rings upon the respective ends thereof, the tandem rings being designated 34—35 and 36—37. The hubs 38 of the inner rings 35 and 36 have tapered outer peripheries 39 to receive tapered inner bores 40 of the outer packing rings to maintain wedging seal with the hubs when the nuts 41 and 42 are applied on the mounting sleeve in a manner similar to the preferred form of the invention. The packing rings shown in Figs. 4 and 5 are otherwise of the same construction as those illustrated and described in connection with the first form of the invention.

What I claim and desire to secure by Letters Patent is:

1. A piston including a packing mounting sleeve having oppositely tapering ends forming packing retaining seats, packing rings having correspondingly tapered bores mounted on said tapered ends of the sleeve, and means for wedging the packing rings on said seats.

2. In a piston including a rod having a tapered portion, a packing mounting sleeve having a tapered bore to receive the rod and having oppositely tapering ends forming packing retaining seats, packing rings having correspondingly tapered bores mounted on said tapered ends of the sleeve, means for wedging the packing rings on said seats, and means for retaining said sleeve on the rod.

3. A piston including a piston rod having a tapered portion, a packing mounting sleeve having a tapered bore to receive the tapered portion of the rod and having spaced packing retaining seats, packing rings mounted on said seats and having bores corresponding to said seats, means on the mounting sleeve engaging the packing rings for wedging the packing rings on said seats, and means for wedging said mounting sleeve on said rod.

4. A piston including a mounting sleeve having a tapering seat and a threaded terminal end, a pair of packing rings arranged in tandem on said sleeve and having interengaging hub portions one of which is provided with a tapered bore mounting the packing rings on said seat, and a nut mounted on the threaded end of the sleeve for urging the packing rings into wedging contact with each other and with said seat.

5. A piston including a packing mounting member having a tapering seat, a plurality of packing elements arranged in tandem on said packing mounting member, one having a tapered seat, and both having tapering bores for respectively engaging said tapered seats, and means for retaining said packing elements on said seats.

6. A piston including a packing mounting member having oppositely tapering seats, and sets of packing elements mounted on said packing mounting member, with the packing elements of each set arranged in opposed tandem, selected elements of the sets having tapered seats and the others having tapering bores for respectively engaging the tapered seats on the mounting member and the tapering seats of said selected packing elements.

7. A piston including a packing mounting member having oppositely tapering packing retaining seats spaced apart and arranged with the larger circumferences in facing relation, packing rings mounted on the seats of said mounting member and having bores respectively corresponding to said seats whereby the rings are retained in spaced relation substantially according to the spacing of said seats, and means for wedging the packing rings on said tapered seats.

8. A piston including a member having a tapered seat, a pair of tandem packing rings mounted on said member and having interengaged conical hub portions and bores corresponding to said tapered seat, and means engaging said member for drawing the packing rings in wedging engagement with each other and with said seat.

WALTER T. CALDWELL.